(12) United States Patent
De Groot

(10) Patent No.: US 6,909,509 B2
(45) Date of Patent: Jun. 21, 2005

(54) OPTICAL SURFACE PROFILING SYSTEMS

(75) Inventor: Peter J. De Groot, Middletown, CT (US)

(73) Assignee: Zygo Corporation, Middlefield, CT (US)

(*) Notice: Subject to any disclaimer, the term of this patent is extended or adjusted under 35 U.S.C. 154(b) by 237 days.

(21) Appl. No.: 10/025,595

(22) Filed: Dec. 18, 2001

(65) Prior Publication Data

US 2002/0135774 A1 Sep. 26, 2002

Related U.S. Application Data

(60) Provisional application No. 60/269,982, filed on Feb. 20, 2001.

(51) Int. Cl.$^7$ ............................................. G01B 9/02
(52) U.S. Cl. ........................................................ 356/497
(58) Field of Search ............................... 356/497, 511, 356/498

(56) References Cited

U.S. PATENT DOCUMENTS

| | | | |
|---|---|---|---|
| 4,340,306 A | | 7/1982 | Balasubramanian |
| 4,869,593 A | | 9/1989 | Biegen |
| 5,133,601 A | * | 7/1992 | Cohen et al. ............... 356/497 |
| 5,239,178 A | | 8/1993 | Derndinger et al. |
| 5,398,113 A | | 3/1995 | de Groot |
| 5,737,084 A | | 4/1998 | Ishihara |
| 5,760,901 A | * | 6/1998 | Hill ............................ 356/450 |
| 5,962,852 A | * | 10/1999 | Knuettel et al. ....... 250/339.11 |
| 6,133,986 A | * | 10/2000 | Johnson ........................ 355/67 |
| 6,392,752 B1 | * | 5/2002 | Johnson ....................... 356/511 |
| 6,485,413 B1 | * | 11/2002 | Boppart et al. ............. 600/160 |
| 6,493,093 B2 | * | 12/2002 | Harasaki et al. ............ 356/497 |
| 6,628,370 B1 | * | 9/2003 | McCullough et al. ......... 355/53 |

OTHER PUBLICATIONS

Caber, Paul J., "Interferometric Profiler for Rough Surfaces", *Applied Optics*, vol. 32, No. 19, Jul. 1, 1993, pp. 3438–3441.

Dresel, Thomas et al., "Three–dimensional sensing of rough surfaces by coherence radar", *Applied Optics*, vol. 31, No. 7, Mar. 1, 1992, pp. 919–925.

Tiziani H.J. et al., "Chromatic confocal microscopy with microlenses", *Journal of Modern Optics*, vol. 43, No. 1, 1996, pp. 155–163.

Tiziani H.J. et al., "Three–dimensional analysis by a micro–lens–array confocal arrangement", *Applied Optics*, vol. 33, No. 4, Feb. 1, 1994, pp 567–572.

* cited by examiner

*Primary Examiner*—Andrew H. Lee
(74) *Attorney, Agent, or Firm*—Fish & Richardson P.C.

(57) ABSTRACT

An interferometric surface profiler implements a lenslet array to accommodate a large field of view (FOV) without a corresponding loss in light efficiency. Using the lenslet array, the optical surface profiler multiplexes the measurement of an interference phase over multiple spots on a measurement surface, with each spot corresponding to an element of the lenslet array. The FOV of the profiler corresponds to the area of the measurement surface spanned by the spots, and each lenslet element provides a large numerical aperture for each spot, thereby improving light efficiency. The large FOV and increased light efficiency are useful in scanning white light interferometry, as well as other types of interferometric analysis of surface form and roughness such as phase shifting interferometry.

68 Claims, 6 Drawing Sheets

OPTICAL SURFACE PROFILING SYSTEMS

CROSS REFERENCE TO RELATED APPLICATIONS

This application claims priority from U.S. Provisional Application Ser. No. 60/269,982, filed on Feb. 20, 2001, which is incorporated herein by reference in its entirety.

TECHNICAL FIELD

This invention relates to interferometric systems, and more particularly to interferometric systems for optical surface profiling having an increased field of view.

BACKGROUND

Interferometric optical techniques are widely used to measure flatness of a surface of an object. For example, to measure the surface profile of a measurement surface, one can use an interferometer to combine a measurement wavefront reflected from the measurement surface with a reference wavefront reflected from a reference surface to form an optical interference pattern. Spatial variations in the intensity profile of the optical interference pattern correspond to phase differences between the combined measurement and reference wavefronts caused by variations in the profile of the measurement surface relative to the reference surface.

One technique for accurate interferometric measurements of surface profiles is phase-shifting interferometry (PSI). With PSI, an optical interference pattern is recorded for each of multiple phase-shifts between the reference and measurement wavefronts to produce a series of optical interference patterns that span, for example, at least a full cycle of optical interference (e.g., from constructive, to destructive, and back to constructive interference). The optical interference patterns define a series of intensity values for each spatial location of the pattern, wherein each series of intensity values has a sinusoidal dependence on the phase-shifts with a phase-offset equal to the phase difference between the combined measurement and reference wavefronts for that spatial location. The phase-offset for each spatial location is extracted from the sinusoidal dependence of the intensity values to provide a profile of the measurement surface relative the reference surface. The algorithms for such phase extraction are generally referred to as phase-shifting algorithms.

Scanning white-light interferometry (SWLI) is another interferometric technique for measuring surface profiles. With SWLI, reference and measurement wavefronts are derived from a common broadband source, and an optical interference pattern is measured as one scans an optical path difference (OPD) between the reference and measurement wavefronts. The optical interference pattern includes local fringes only where the local OPD is within the coherence length of the broadband source. Thus, the surface profile can be determined from the localization of fringes with respect to the OPD scan position. SWLI shares the advantages of accuracy and high resolution with phase-shifting interferometry, while having additional advantages by virtue of the broad emission spectrum of the source light. The broad spectrum makes it possible to profile surfaces accurately and unambiguously with substantially greater roughness and surface departure than is practical with monochromatic interferometers.

In both techniques, the profiling instrument is typically implemented as a microscope having high magnifying power (M>1) to facilitate high accuracy and resolution. However, an instrument that utilizes a large magnifying power profiles a correspondingly small area of the surface during a single measurement (e.g., 2 mm in a typical instrument). In other words, an instrument with a large magnification profiles a small field of view (FOV) and vice versa. To map surfaces which are larger than the FOV, the instrument translates different portions of the surface into the FOV of the instrument and performs multiple measurements.

Although larger fields of view are of great practical interest, instruments capable of imaging larger FOV exhibit decreased light efficiency, and decreased rough-surface interference contrast, which results in reduced resolution and accuracy.

SUMMARY

The invention features an interferometric surface profiler that implements a lenslet array to accommodate a large field of view (FOV) without a corresponding loss in light efficiency. Using the lenslet array, the optical surface profiler multiplexes the measurement of an interference phase over multiple spots on a measurement surface, with each spot corresponding to an element of the lenslet array. The FOV of the profiler corresponds to the area of the measurement surface spanned by the spots. In addition, each lenslet element provides a large numerical aperture for each spot, thereby improving light efficiency. The large FOV and increased light efficiency are useful in scanning white light interferometry, as well as other types of interferometric analysis of surface form and roughness such as phase shifting interferometry.

In general, in one aspect, the invention features an interferometry method providing enhanced light collection, the method including the following steps: (i) directing a measurement beam to contact a measurement surface (e.g., a diffusely reflecting measurement surface) and a reference beam to contact a reference surface, wherein the measurement and reference beams are derived from a common source; (ii) imaging light reflected from the measurement surface onto a multi-element detector (e.g., a CCD camera) through an optical system including a lenslet array; and (iii) imaging light reflected from the reference surface onto the multi-element detector to interfere with the light reflected from the measurement surface.

In general, in a first aspect, the invention features an interferometry method including the following steps: (i) directing a measurement beam to contact a measurement surface (e.g., a diffusely reflective measurement surface) and a reference beam to contact a reference surface, wherein the measurement and reference beams are derived from a common source; (ii) imaging light reflected from the measurement surface onto a multi-element detector (e.g., a CCD camera) through an optical system including a lenslet array; and (iii) imaging light reflected from the reference surface onto the multi-element detector to interfere with the light reflected from the measurement surface.

The interferometry method can include any of the following features or steps.

The lenslet array can be positioned to generate a virtual image of the measurement surface in a virtual image plane. The optical system can further include a detector imaging system for imaging the virtual image in the virtual image plane onto the detector and/or object imaging system (e.g., including a telecentric relay) for imaging the measurement surface onto an intermediate image plane adjacent the lenslet array. The method can include combining the light reflected from the measurement surface with the light reflected from the reference surface and directing the combined light towards the lenslet array through the object imaging system. The object imaging system can image the reference surface onto the intermediate image plane to overlap with the image of the measurement surface. The lenslet array can be positioned to generate a virtual image of the reference surface in the virtual image plane to overlap with the virtual image of the measurement surface, and the detector imaging system can image the overlapping virtual images of the measurement and reference surfaces onto the detector. In some cases, the detector imaging system can be selected to demagnify the virtual image onto the detector. Also, the magnification of the object imaging system can be selected to be greater than the magnification of the detector imaging system.

The optical system can be selected to demagnify the light reflected from the measurement object onto the detector. Alternatively, or additionally, the optical system can be selected to cause each element of the lenslet array to couple incident light reflected from the measurement object to a different one of the detector elements.

The lenslet array can include an array of refractive, reflective, and/or diffractive elements each having focusing power.

The method can also include measuring an intensity signal at each of the detector elements and determining a surface profile of a measurement object based on the measured signals.

The common source can be a broadband source and the method can include varying an optical path length difference between the measurement and reference surfaces over a range larger than a coherence length defined by the broadband source and measuring an intensity signal at each of the detector elements as a function of the optical path length difference.

The method can include the additional steps of (i) directing an input beam from the source into the lenslet array to produce an intermediate beam comprising an array of sub-beams; and (ii) separating the intermediate beam into the measurement and reference beams, wherein the lenslet array is positioned to cause the measurement beam to contact the measurement surface as an array of focused spots corresponding to the array of sub-beams. The lenslet array can be positioned to generate a virtual image of the measurement surface in a virtual image plane, and each element of the lenslet array can image a region of the measurement object corresponding to a different one of the array of focused spots.

The optical system including the lenslet array can match an objective numerical aperture with an image numerical aperture, and the magnification of the optical system can be less than 1.

In a second general aspect, the invention includes an interferometry method including the following steps: (i) providing measurement and reference beams derived from a common source; (ii) directing the measurement beam to contact a measurement surface (e.g., a diffusely reflecting measurement surface) as an array of focused spots and directing the reference beam to contact a reference surface; (iii) imaging light reflected from the measurement surface onto a multi-element detector; and (iv) imaging light reflected from the reference surface onto the multi-element detector to interfere with the light reflected from the measurement surface.

The interferometry method can include any of the following feature and/or additional steps.

The method can include directing an input beam into a lenslet array to produce an intermediate beam comprising an array of sub-beams, and separating the intermediate beam into the measurement beam and the reference beam. The lenslet can be positioned to cause the measurement beam to contact the measurement surface as the array of focused spots and each of the focused spots can correspond to a different one of the sub-beams. The method can also include imaging the intermediate beam from the lenslet array to a beam splitter positioned to separate the intermediate beam into the measurement and reference beams. The intermediate beam can be imaged using a telecentric relay.

In general, in a further aspect, the invention includes an interferometry system for profiling a measurement surface (e.g., a diffusely reflecting measurement surface). The system includes a multi-element detector (e.g., a CCD camera) and an interferometer that during operation directs a measurement beam to contact the measurement surface and a reference beam to contact a reference surface. The system images light reflected from the measurement surface to overlap on the multi-element detector with light reflected from the reference surface. The measurement and reference beams are derived from a common light source and the interferometer includes an optical system comprising a lenslet array to image the light reflected from the measurement surface onto the detector.

Embodiments of the interferometry system can have any of the following features.

The lenslet array can be positioned to generate a virtual image of the measurement surface in a virtual image plane. The optical system can include a detector imaging system for imaging the virtual image in the virtual image plane onto the detector, and an object imaging system (e.g., including a telecentric relay) for imaging the measurement surface onto an intermediate image plane adjacent the lenslet array. The magnification of the object imaging system is selected to be greater than the magnification of the detector imaging system.

During operation the system can combine the light reflected from the measurement surface with the light reflected from the reference surface and can direct the combined light towards the lenslet array through the object imaging system. The object imaging system can then image the reference surface onto the intermediate image plane to overlap with the image of the measurement surface. The lenslet array can be positioned to generate a virtual image of the reference surface in the virtual image plane to overlap with the virtual image of the measurement surface, and the detector imaging system can image the overlapping virtual images of the measurement and reference surfaces onto the detector.

The detector imaging system can be selected to demagnify the virtual image onto the detector.

The optical system can be selected to demagnify the light reflected from the measurement object onto the detector.

The optical system can be selected to cause each element of the lenslet array to couple incident light reflected from the measurement object to a different one of the detector elements.

The system can include an analyzer that measures an intensity signal at each of the detector elements and determines a surface profile of a measurement object based on the measured signals.

The system can also include the light source, a positioning system for scanning an optical path length difference between measurement and reference paths over a range larger than a coherence length defined by the light source, and an analyzer that causes the positioning system to vary the optical path difference and measures an intensity signal at each of the detector elements as a function of the optical path length difference.

The interferometer further can include a beamsplitter. The lenslet array can be positioned to accept an input beam from the light source and produce an intermediate beam including an array of sub-beams, and the beamsplitter can be positioned to separate the intermediate beam into the measurement and reference beams, and the lenslet array can be positioned to cause the measurement beam to contact the measurement surface as an array of focused spots corresponding to the array of sub-beams.

The lenslet array can be positioned to generate a virtual image of the measurement surface in a virtual image plane, and each element of the lenslet array images a region of the measurement object corresponding to a different one of the array of focused spots.

The interferometer can also include a mount for securing the measurement object defining the measurement surface.

The optical system including the lenslet array can match an objective numerical aperture with an image numerical aperture, and the magnification of the optical system can be less than 1.

In a further general aspect, the invention includes an interferometry system for profiling a measurement surface. The system includes a multi-element detector (e.g., a CCD camera) and an interferometer. During operation, the interferometer directs a measurement beam to contact the measurement surface and a reference beam to contact a reference surface, and images light reflected from the measurement surface to overlap on the multi-element detector with light reflected from the reference surface. The measurement and reference beams are derived from a common source and the interferometer includes an optical system including a lenslet array. The lenslet array directs the measurement beam to contact the measurement surface as an array of focused spots.

Embodiments of the interferomentric system can include any of the following features.

The interferometer can include a beamsplitter. The lenslet array can be positioned to produce an intermediate beam comprising an array of sub-beams, and the beamsplitter can be positioned to separate the intermediate beam into the measurement beam and the reference beam, and the measurement beam can contact the measurement surface as the array of focused spots. Each of the focused spots can correspond to a different one of the sub-beams.

The interferometer further can also include a telecentric relay to image the intermediate beam from the lenslet array to the beamsplitter.

In yet a further general aspect, the invention features an interferometric system including an interferometer configured to receive a light beam from a light source and generate an optical interference pattern, and a lens system including a numerical aperture converter. The lens system is configured to transmit the light beam from the light source to the interferometer and to receive and image the optical interference pattern onto a detector. The numerical aperture converter of the lens system matches an objective numerical aperture of the lens system for illuminating the interferometer to an image numerical aperture of the lens system for imaging the optical interference onto the detector.

In general, in another aspect, the invention features a method for profiling the surface of an object with an interferometric system. The method includes transmitting a light beam from a light source to an interferometer through a lens system, and receiving and imaging an optical interference pattern produced by the interferometer onto a detector via the lens system. The lens system includes a numerical aperture converter which matches an objective numerical aperture of the lens system for illuminating the interferometer to an image numerical aperture of the lens system for imaging the optical interference onto the detector.

Embodiments of the invention may provide the following advantages: (i) high light gathering efficiency over large, diffusely reflecting object surfaces without requiring high-numerical aperture (NA) imaging optics at the detector; and (ii) overall form of a large object surface while retaining statistical information about the surface roughness normally beyond the resolution of the camera. In particular, with regard to the latter feature, embodiments may facilitate large-FOV form measurements while retaining sensitivity to fine-grain surface roughness.

Another benefit of the larger object NA is the improved tolerance to tilts of the object surface when the part has a roughness negligible compared to the wavelength of light. The specular reflection of the illumination light is more easily captured within the larger collection solid angle. This is the case when measuring optical surfaces or polished mechanical parts. This property makes such an instrument more suitable to production-floor automatic part positioning, being less affected by the part orientation.

Other features, objects, and advantages of the invention will be apparent from the description and drawings, and from the claims.

DESCRIPTION OF DRAWINGS

Like reference symbols in the various drawings indicate like elements.

DETAILED DESCRIPTION

The invention features an interferometric surface profiling apparatus including a lenslet array that focuses illumination into an array of small spots on a measurement object surface. Light reflected from the surface is collected by the lenslet array (or by a second, similar lenslet array) and each spot is imaged to an element of a detector array. As a result, the apparatus multiplexes the measurement of an interferometric phase over multiple spots on the surface. The field of view (FOV) of the system corresponds to the area of the measurement surface spanned by the spots. The lenslet array defines an array of elements each having focusing power. For example, an element of the array may provide focusing power through refraction, reflection, or diffraction. The profiler also includes additional optical components, such as a beam splitter and reference mirror, as needed for generating interference data related to the local object surface height.

Figure 1:
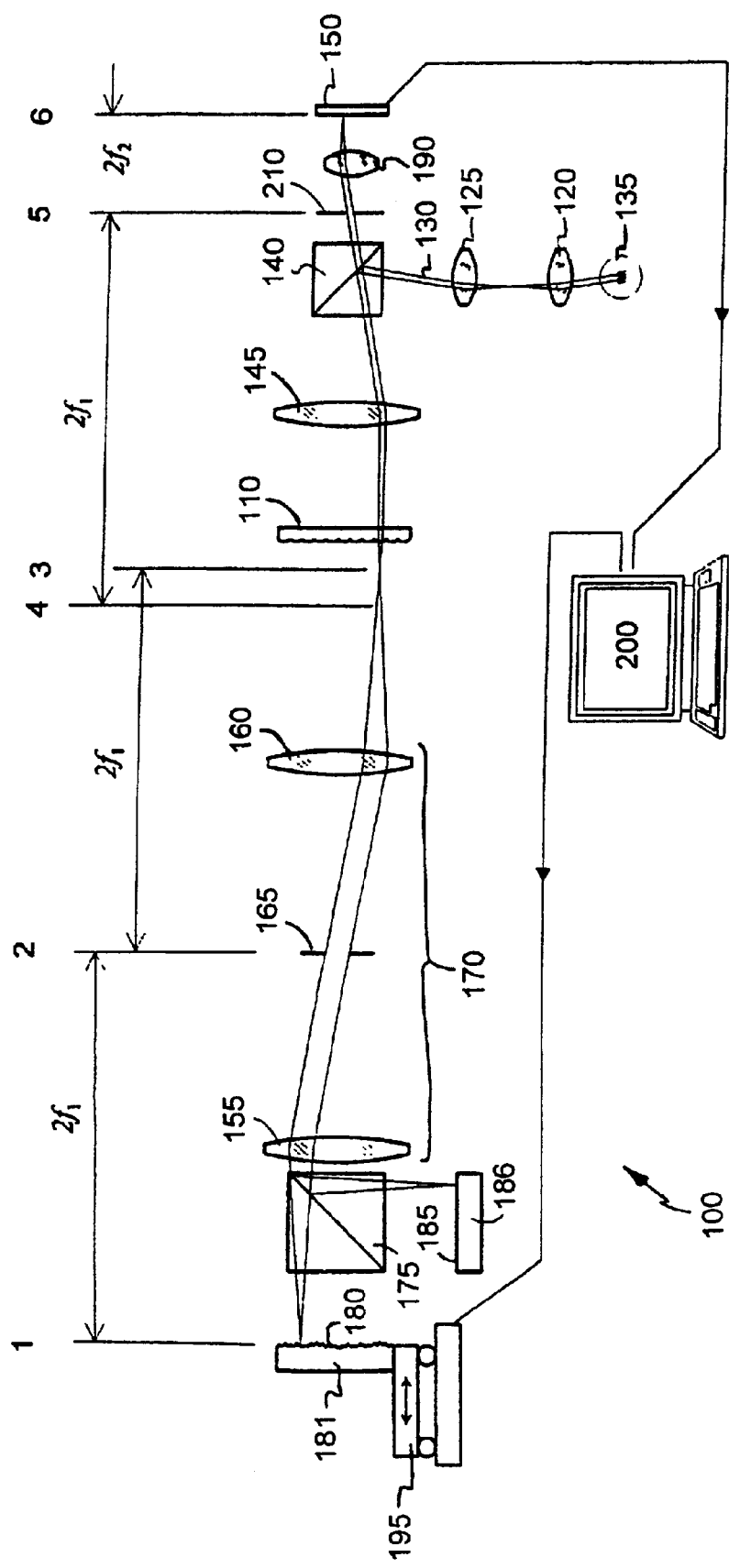
FIG. 1 is a schematic representation of an interferometric surface profiler.

Referring to FIG. 1, an interferometric optical surface profiler 100 that includes a lenslet array 110. Lenses 120 and 125 direct an illumination beam 130 from a light-source 135 through to an illumination beam splitter 140, which redirects illumination beam 130 through lens 145 to lenslet array 110. Lens 145 has a focal length $f_1$. Lenslet array 110 focuses illumination beam 130 to an illumination spot array at plane 3 in FIG. 1. While, for clarity, FIG. 1 shows rays traced through one element of lenslet array 110 only, it is understood that each of the elements in lenslet array 110 focus similar rays to plane 3, thereby forming the illumination spot array. A combination of lenses 155 and 160, both having focal length $f_1$ and acting together as a telecentric relay lens 170, projects the illumination spot array through an interference beamsplitter 175, forming a measurement spot array at plane 1. An objective stop 165 at plane 2, between lenses 155 and 160, blocks extraneous light from the system. A measurement surface 180 of a measurement object 181 is positioned at or near plane 1, and is illuminated by the measurement spot array. Measurement object 180 is mounted on a scanning stage 195, which can move the measurement surface with respect to plane 1. Measurement surface 180 reflects (e.g., diffusely reflects) light from measurement spot array to form a measurement beam.

Additionally, a portion of illumination beam 130 is redirected by interference beamsplitter 175 as a reference spot array to a reference surface 185 of a reference mirror 186. Reference surface 185 reflects light from reference spot array to form a reference beam. The measurement and reference beams recombine at interference beamsplitter 175 into a single reflected beam and pass back through relay lenses 155 and 160 to create a real image of the overlapping measurement and reference spot arrays at plane 3.

Lenslet array 110 collects the reflected beam and creates a virtual image at plane 4 in FIG. 1. Each element of the lenslet array effectively collects light scattered into a cone from a spot on the measurement surface. As these spots are spaced at discrete intervals across an area of the measurement surface, light collection by the lenslet array undersamples the measurement surface. Lens 145 and a camera lens 190 (which has a focal length $f_2$) reimage each overlapping measurement and reference spot onto a corresponding detector element of a CCD camera 150 at plane 6. To exploit the resolution of the camera, the total number of lenslet elements in lenslet array 110 may equal to the number of detector elements in a CCD camera 150. A camera imaging pupil 210 is positioned between lens 145 and lens 190. The return beam contains interference information related to the optical path difference (OPD) for the measurement and reference beams, and can be related to the characteristics of measurement surface 180.

The optical system includes objective stop 165 at the objective pupil plane 2, which, in addition to blocking extraneous light from the system's optical path, also controls the numerical aperture (NA) of telecentric relay lens 170. The NA in object space, i.e., the objective aperture ($NA_{obj}$), is approximately equal to the objective pupil divided by twice the focal length $f_1$ of lens $L_1$. The NA of a system provides a measure of the angular light gathering power of a system. A system with a high NA gathers light over a wide cone from a point source than does a system with a low NA. There is also a camera stop 210 at the imaging pupil plane 5, which controls the imaging aperture ($NA_{imag}$). If the lenslet array were removed and the remaining lenses adjusted for proper focus, the ratio of these two apertures would be controlled by the overall magnification, M, of the optical system:

$$NA_{obj}=M \times NA_{imag} \quad \text{(without lenslet array)}$$

With the lenslet array in place, it is possible to adjust the ratio of the objective and imaging apertures without changing the magnification. In particular, FIG. 1, shows a magnification M=¼ but by means of the lenslet array, the apertures are matched such that:

$$NA_{obj}=NA_{imag} \quad \text{(with lenslet array)}$$

Consequently, the objective aperture $NA_{obj}$ is 4× larger than would normally be feasible without the use of a lenslet array, for any fixed imaging aperture $NA_{imag}$. Given that there are practical limits to the design of high-NA imaging optics, the inventive apparatus can provide a significantly larger objective aperture for low magnifications (M<1).

An increased objective aperture $NA_{obj}$ at low magnifications on the objective side is useful for improving the light efficiency of the optical system, particularly with large, diffusely reflecting surfaces. Thus, low-NA objective optics only accept returned light along paths close to the normal to the surface, whereas a high-NA objective optics collects light over a larger range of angles. Assuming that the object reflects uniformly in all directions, e.g. it is a lambertian scattering surface, the optical light gathering power is proportional to the square of the objective aperture $NA_{obj}$. Thus the increase in objective aperture $NA_{obj}$ made possible by the inventive apparatus and method increases the light efficiency of the instrument when compared to prior art systems. For example, the gain is a factor of 16 in the embodiment of FIG. 1. This increased light efficiency also reduces the variation in return light level from the object surface with variations in surface roughness and texture. Both of these enhancements are important for interferometric characterization of the surface.

Figure 2:
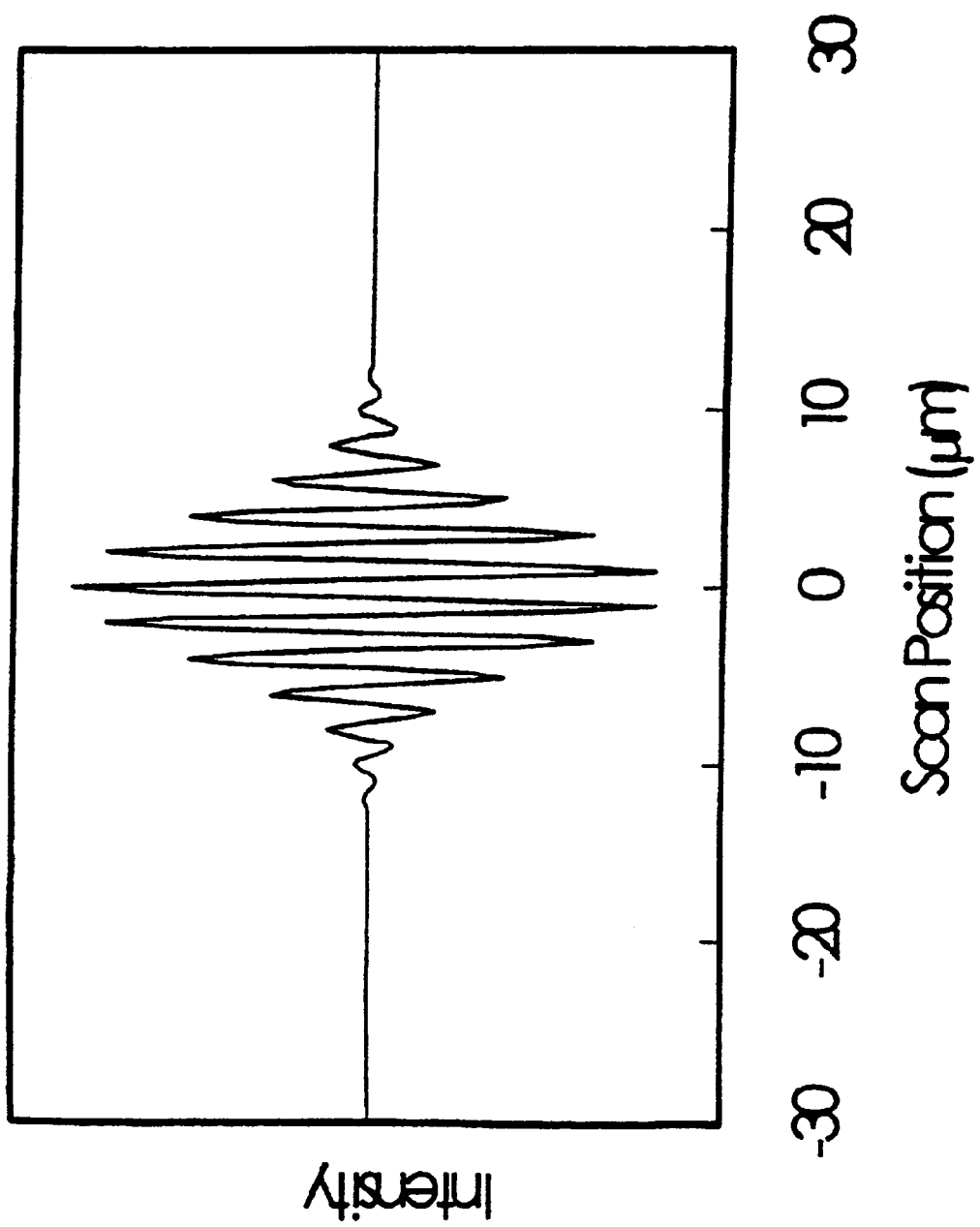
FIG. 2 is a plot of interference intensity as a function of scan position.

Referring again to FIG. 1, a computer 200 accepts electronic intensity data from CCD camera 150 while mechanically scanning the OPD between the measurement and reference beams, in this case by displacing measurement object 181 with scanning stage 195. An example data set for a single camera pixel as a function of scan position is shown in FIG. 2. The localization of fringe data around the zero optical-path difference (OPD) position shown in FIG. 2 is characteristic of interferometry with a broadband source. The fringe localization provides a means of determining the precise moment when the measurement plane intersects the object point corresponding to the image pixel. The scan motion is precisely controlled, so that knowledge of when a given object point is at zero OPD can be directly translated into a local surface height.

One may apply any of a variety of techniques for determining surface height using localized fringes. One approach is to determine the scan position of peak fringe contrast. For example interference data for a first pixel looks as in FIG. 2, with a peak fringe contrast at a scan position of 0 μm. A second pixel might have a peak fringe contrast at a different scan position, for example 10 μm. The absolute height difference between the two object points corresponding to these image pixels would therefore be 10 μm. The computer then processes the intensity data to determine the scan position for zero OPD at each CCD pixel and hence the surface profile. More generally, the data processing may involve, for example, coherence envelope detection as described by T. Dresel et al. in an article titled "Three-dimensional sensing of rough surfaces by coherence radar,"

published in Applied Optics 31(7), 919–925 (1992) or spatial frequency analysis described by P. de Groot in U.S. Pat. No. 5,398,113.

Interferometric optical surface profiler 100 multiplexes the measurement of local surface height over multiple points (e.g., spots) that span an area of the measurement surface. A computer interpolates the surface height between the sampled areas, thereby providing a surface height profile of the whole surface area spanned by the spots. Although, the spots under-sample that surface area, the method does not compromise the resolution of the system when the spots exploit the full number of available detector elements (i.e., every detector element corresponds to at least one spot). Systems that image the entire measurement area onto the CCD camera are similarly limited to the resolution of the detector, as the intensity of the image is integrated over each detector element.

Figure 3B:
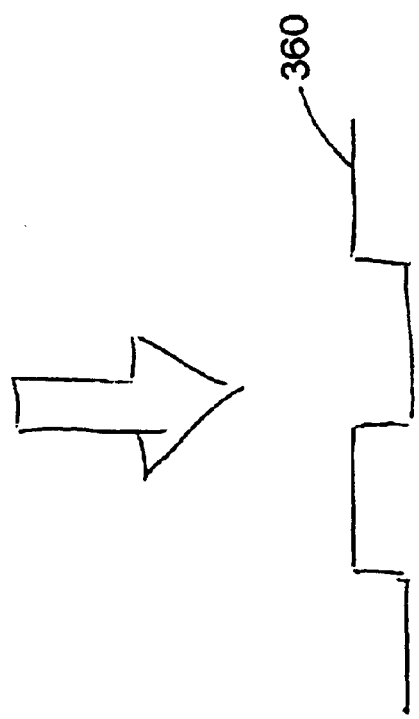
FIGS. 3A and 3B are schematic representations comparing the resolution of a typical imaging interferometer and an interferometer including a lenslet array.
Figure 3B:
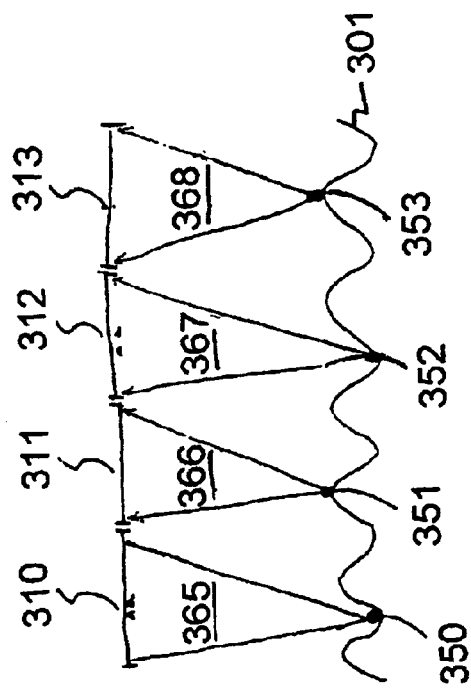
Figure 3A:
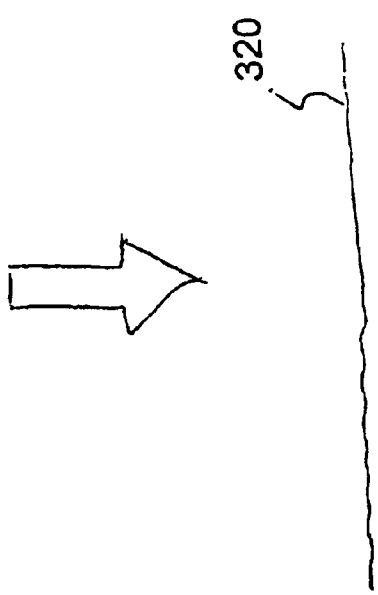
Figure 3A:
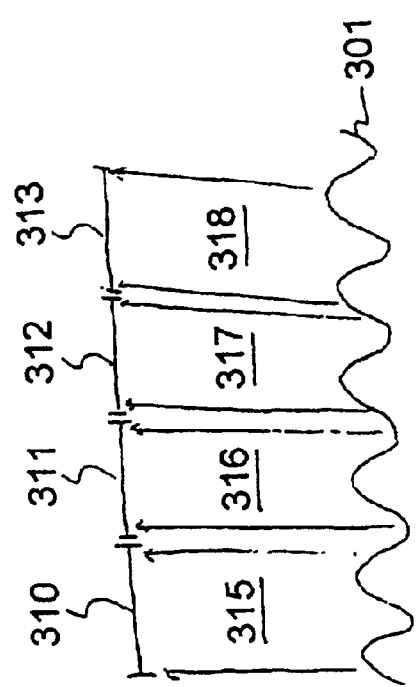

Referring now to FIGS. 3A and 3B, because the illumination is comprised of an array of small spots, the statistical noise in the surface profile relates to high spatial-frequency roughness as well as to surface form. Thus the rapidly-varying portion of the measured surface profile contains information about surface characteristics at a higher spatial frequency than would be expected based on the pixel density of the camera. FIG. 3A illustrates the surface height profile measurement process as performed by a conventional imaging interferometric system. Each detector element 310–313 of the CCD camera integrate signals 315–318, respectively, across its area, averaging out the high spatial frequency information from a measurement surface 301. The measured profile 320 displays none of the high-spatial frequency roughness of surface 301. By sampling discrete points 350–353 on surface 301, as shown in FIG. 3B, detector elements 310–313 detect signals 365–368, which contain only optical path difference information from spots 350–553, respectively. Hence, the measured profile 360 displays some of the high-spatial frequency roughness of surface 301. Sampling the entire surface 301 by scanning spots 350–353 laterally can allow a user to determine the surface profile with the resolution of the spot size. In the embodiment of FIG. 1, the sensitivity to surface roughness is greater than would be possible without the aid of the lenslet array.

Figure 4:
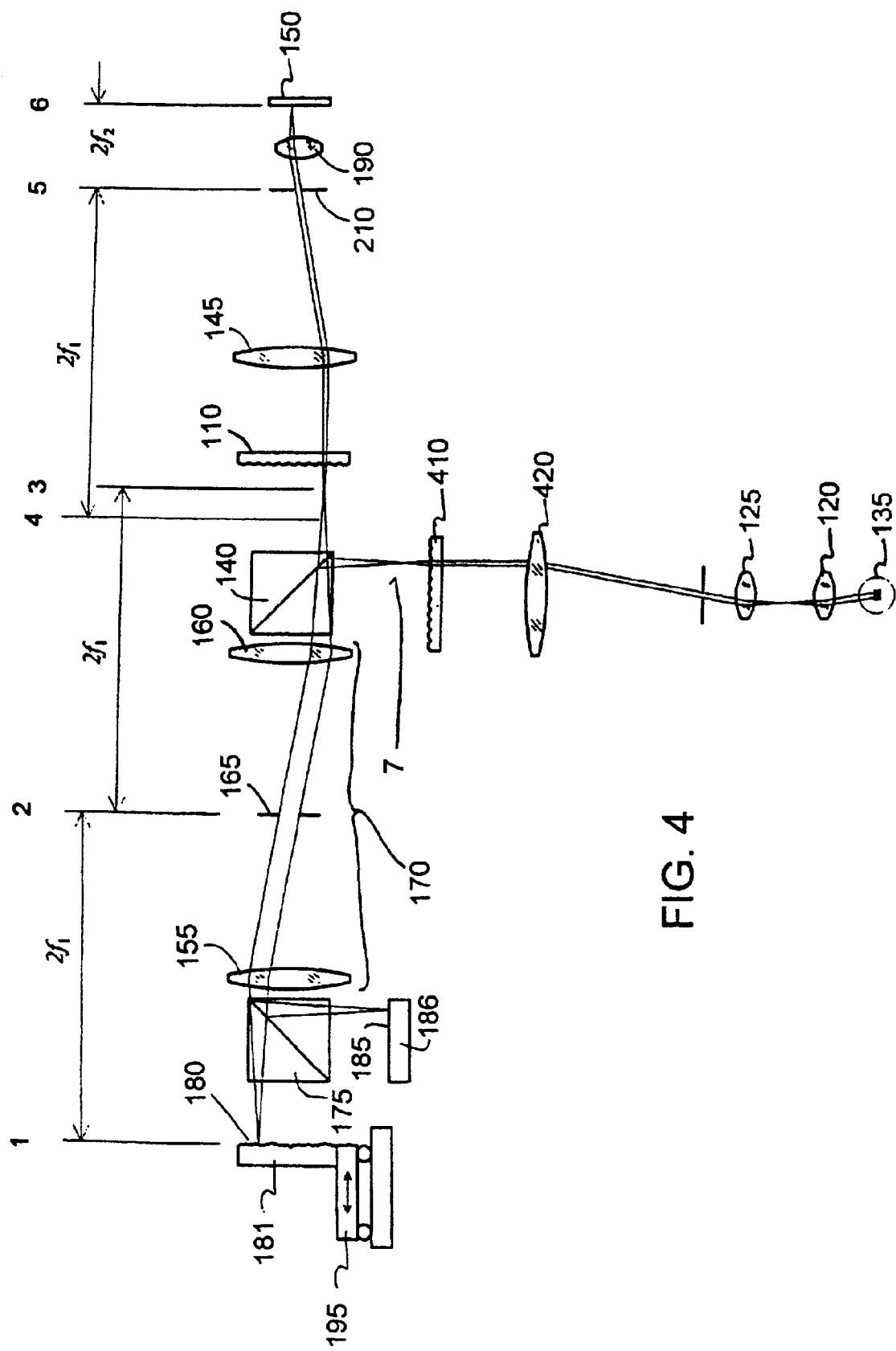
FIG. 4 is a schematic representation of a second embodiment of an interferometric surface profiler.

In the embodiment of FIG. 1, a single lenslet array is used to deliver light to the measurement surface, and collect light from the measurement surface. In additional embodiments, separate lenslet arrays may be used to perform these functions as in the embodiment of FIG. 4. Referring to FIG. 4, an interferometry optical surface profiler 400, which is a variation of the interferometry optical surface profiler 100 described above (see FIG. 1), includes a second lenslet array, an illumination lenslet array 410, which separates the function of forming the spot arrays from collimated illumination beam 130 and collecting the measurement and reference beams. Illumination beamsplitter is positioned between lenslet array 110 and lens 160, directing illumination beam 130 to telecentric relay 170. Illumination lenslet array 410 is positioned between a collimating lens 420 (with focal length $f_1$) and illumination beamsplitter 140. Collimating lens 410 directs illumination beam 130 to illumination lenslet array 410, which focuses illumination beam 130 to the illumination spot array at plane 7. Illumination beamsplitter 140 directs illumination beam 130 toward telecentric relay 170, into the same optical path as described for interferometric optical surface profiler 100 (See FIG. 1). In optical surface profiler 400, lenslet array 110 only functions only to collect light from telecentric relay 170, and not in the generation of the illumination spot array. Note that lenslet array 410 should be carefully registered to provide the measurement spot array at the same positions on measurement surface 180 that lenslet array 110 samples to ensure efficient light collection.

Figure 5:
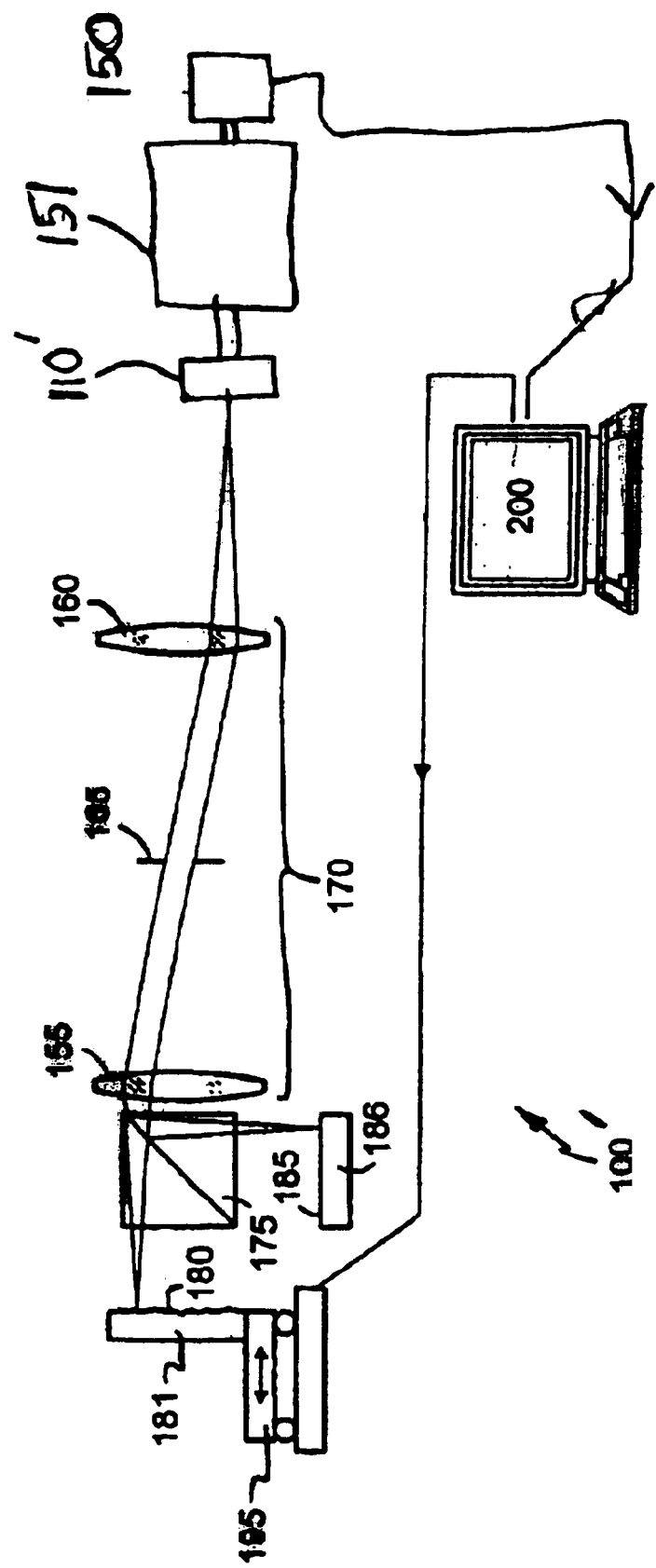
FIG. 5 is a schematic representation of a third embodiment of an interferometric surface profiler.

Referring to FIG. 5, an interferometric optical profiler 100' includes a detector optical imaging system 151 and a lenslet array 110' comprising an array of elements each providing focusing power through diffraction.

Figure 6:
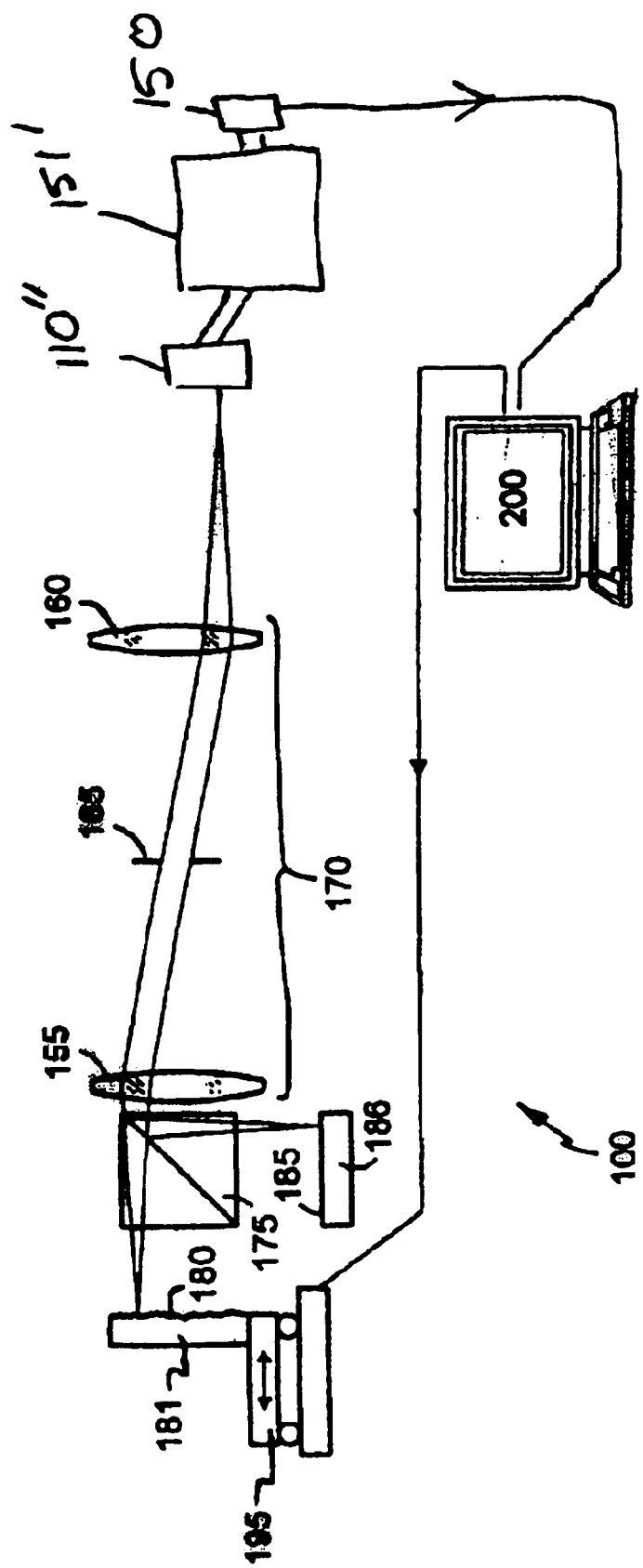
FIG. 6 is a schematic representation of a fourth embodiment of an interferometric surface profiler.

Referring to FIG. 6, an interferometric optical profiler 100" includes a detector optical imaging system 151' and a lenslet array 110" comprising an array of elements each providing focusing power through reflection.

Further embodiments may include those in which there is only one lenslet array to either deliver light to the measurement surface, or collect light from the measurement surfaces. Although such embodiments do not include all of the advantages associated embodiments that use one or more lenslet arrays to perform both functions, they provide some advantages.

A number of embodiments of the invention have been described. Nevertheless, it will be understood that various modifications may be made without departing from the spirit and scope of the invention. For example, further uses of the instrument include combining measurements of two or more different object surfaces either at the same time or in sequence, in order to determine e.g. the thickness of an object, or the perpendicularity of surfaces, etc. Accordingly, other embodiments are within the scope of the following claims.

What is claimed is:

1. An interferometry method comprising:
   directing a measurement beam to contact a measurement surface and a reference beam to contact a reference surface, wherein the measurement and reference beams derived from a common source;
   imaging, with a magnification of less than 1, light reflected from the measurement surface onto a multi-element detector through an optical system comprising at least one focusing optic and a lenslet array, the at least one focusing optic positioned along an optical path between the measurement surface and the lenslet array; and
   imaging light reflected from the reference surface onto the multi-element detector to interfere with the light reflected from the measurement surface.

2. The method of claim 1, wherein the lenslet array is positioned to generate a virtual image of the measurement surface in a virtual image plane.

3. The method of claim 2, wherein the optical system further comprises a detector imaging system for imaging the virtual image in the virtual image plane onto the detector.

4. The method of claim 3, wherein the optical system further comprises an object imaging system for imaging the measurement surface onto an intermediate image plane adjacent the lenslet array, the optical imaging system comprising the focusing optic.

5. The method of claim 4, wherein the object imaging system comprises a telecentric relay.

6. The method of claim 4, further comprising combining the light reflected from the measurement surface with the light reflected from the reference surface and directing the combined light towards the lenslet array through the object imaging system.

7. The method of claim 6, wherein the object imaging system images the reference surface onto the intermediate image plane to overlap with the image of the measurement surface.

8. The method of claim 7, wherein the lenslet array is positioned to generate a virtual image of the reference surface in the virtual image plane to overlap with the virtual image of the measurement surface, and wherein the detector imaging system images the overlapping virtual images of the measurement and reference surfaces onto the detector.

9. The method of claim 3, wherein the detector imaging system is selected to demagnify the virtual image onto the detector.

10. The method of claim 4, wherein the magnification of the object imaging system is selected to be greater than the magnification of the detector imaging system.

11. The method of claim 1, wherein the measurement surface is diffusely reflective.

12. The method of claim 1, wherein the optical system is selected to cause each element of the lenslet array to couple incident light reflected from the measurement object to a different one of the detector elements.

13. The method of claim 1, wherein the lenslet array comprises an array of refractive elements each having focusing power.

14. The method of claim 1, wherein the lenslet array comprises an array of reflective elements each having focusing power.

15. The method of claim 1, wherein the lenslet array comprises an array of diffractive elements each having focusing power.

16. The method of claim 1, further comprising measuring an intensity signal at each of the detector elements and determining a surface profile of a measurement object based on the measured signals.

17. The method of claim 1, wherein the common source is a broadband source and the method further comprises varying an optical path length difference between the measurement and reference surfaces over a range larger than a coherence length defined by the broadband source and measuring an intensity signal at each of the detector elements as a function of the optical path length difference.

18. The method of claim 1, wherein the multi-element detector is a CCD camera.

19. The method of claim 1, further comprising:
directing an input beam from the source into the lenslet array to produce an intermediate beam comprising an array of sub-beams; and
separating the intermediate beam into the measurement and reference beams, wherein the lenslet array is positioned to cause the measurement beam to contact the measurement surface as an array of focused spots corresponding to the array of sub-beams.

20. The method of claim 19, wherein the lenslet array is positioned to generate a virtual image of the measurement surface in a virtual image plane, wherein each element of the lenslet array images a region of the measurement object corresponding to a different one of the array of focused spots.

21. The method of claim 1, wherein the optical system comprising the lenslet array matches an objective numerical aperture with an image numerical aperture.

22. The method of claim 21, wherein the magnification of the optical system is less than 1.

23. The method of claim 1, wherein the imaging, with a magnification of less than 1, light reflected from the measurement surface onto a multi-element detector through an optical system comprising a lenslet array comprises forming a plurality of virtual images, each virtual image being spaced apart from the measurement surface and the reference surface.

24. An interferometry method comprising:
preparing, from a common source, an array of sub-beams;
relaying, using at least one focusing element, the plurality of sub-beams to a beam splitter to provide a plurality of measurement and reference beams derived from the common source;
directing the measurement beams to contact a measurement surface as an array of focused spots and directing the reference beams to contact a reference surface;
imaging light reflected from the measurement surface onto a multi-element detector; and
imaging light reflected from the reference surface onto the multi-element detector to interfere with the light reflected from the measurement surface.

25. The method of claim 24, wherein the measurements surface is diffusely reflecting.

26. The method of claim 24, wherein preparing an array of sub-beams comprises:
directing an input beam to a lenslet array positioned to cause the measurement beams to contact the measurement surface as the array of focused spots and wherein each of the focused spots corresponds to a different one of the sub-beams.

27. The method of claim 26, wherein relaying comprises collimating the plurality of sub-beams using the at least one focusing element.

28. The method of claim 27, wherein collimating the plurality of sub-beams comprises using a telecentric relay.

29. The interferometry method of claim 24, comprising:
after the preparing the array of sub-beams and before the directing the measurement beams to contact a measurement surface, focusing the sub-beams.

30. An interferometry system for profiling a measurement surface, the system comprising:
a multi-element detector; and
an interferometer which during operation directs a measurement beam to contact the measurement surface and a reference beam to contact a reference surface, and images light reflected from the measurement surface to overlap on the multi-element detector with light reflected from the reference surface, wherein the measurement and reference beams are derived from a common light source and wherein the interferometer includes an optical system comprising a lenslet array and a focusing optic, the lenslet array comprising a plurality of elements, the focusing optic disposed along an optical path between the lenslet array and the measurement surface, the focusing optic configured to receive light from elements of the lenslet array, the optical system configured to image the light reflected from the measurement surface onto the detector, wherein the optical system is configured to demagnify the light reflected from the measurement object onto the detector.

31. The system of claim 30, wherein the lenslet array is positioned to generate a virtual image of the measurement surface in a virtual image plane.

32. The system of claim 31, wherein the optical system further comprises a detector imaging system for imaging the virtual image in the virtual image plane onto the detector.

33. The system of claim 32, wherein the optical system further comprises an object imaging system for imaging the measurement surface onto an intermediate image plane adjacent the lenslet array.

34. The system of claim 33, wherein the object imaging system comprises a telecentric relay.

35. The system of claim 33, wherein during operation the system combines the light reflected from the measurement surface with the light reflected from the reference surface and directs the combined light towards the lenslet array through the object imaging system.

36. The system of claim 35, wherein the object imaging system images the reference surface onto the intermediate image plane to overlap with the image of the measurement surface.

37. The system of claim 36, wherein the lenslet array is positioned to generate a virtual image of the reference surface in the virtual image plane to overlap with the virtual image of the measurement surface, and wherein the detector imaging system images the overlapping virtual images of the measurement and reference surfaces onto the detector.

38. The system of claim 32, wherein the detector imaging system is selected to demagnify the virtual image onto the detector.

39. The system of claim 33, wherein the magnification of the object imaging system is selected to be greater than the magnification of the detector imaging system.

40. The system of claim 30, wherein the optical system is selected to cause each element of the lenslet array to couple incident light reflected from the measurement object to a different one of the detector elements.

41. The system of claim 30, wherein the lenslet array comprises an array of refractive elements each having focusing power.

42. The system of claim 30, wherein the lenslet array comprises an array of reflective elements each having focusing power.

43. The system of claim 30, wherein the lenslet array comprises an array of diffractive elements each having focusing power.

44. The system of claim 30, further comprising an analyzer which during operation measures an intensity signal at each of the detector elements and determines a surface profile of a measurement object based on the measured signals.

45. The system of claim 30, further comprising the light source, a positioning system for scanning an optical path length difference between measurement and reference paths over a range larger than a coherence length defined by the light source, and an analyzer which during operation causes the positioning system to vary the optical path difference and measures an intensity signal at each of the detector elements as a function of the optical path length difference.

46. The system of claim 30, wherein the multi-element detector is a CCD camera.

47. The system of claim 30, wherein the interferometer further comprises a beamsplitter, wherein the lenslet array is positioned to accept an input beam from the light source and produce an intermediate beam comprising an array of sub-beams, wherein the beamsplitter is positioned to separate the intermediate beam into the measurement and reference beams, and wherein the lenslet array is positioned to cause the measurement beam to contact the measurement surface as an array of focused spots corresponding to the array of sub-beams.

48. The system of claim 30, wherein the lenslet array is positioned to generate a virtual image of the measurement surface in a virtual image plane, wherein each element of the lenslet array images a region of the measurement object corresponding to a different one of the array of focused spots.

49. The system of claim 30, wherein the interferometer further includes a mount for securing an measurement object defining the measurement surface.

50. The system of claim 30, further comprising the light source.

51. The system of claim 30, wherein the optical system comprising the lenslet array matches an objective numerical aperture with an image numerical aperture.

52. The system of claim 51, wherein the magnification of the optical system is less than 1.

53. An interferometry system for profiling a measurement surface, the system comprising:
a multi-element detector; and
an interferometer which during operation directs a measurement beam to contact the measurement surface and a reference beam to contact a reference surface, and images light reflected from the measurement surface to overlap on the multi-element detector with light reflected from the reference surface, wherein the measurement and reference beams are derived from a common source and wherein the interferometer includes an optical system comprising a lenslet array and an optical relay positioned along an optical path between the measurement surface and the lenslet array to direct the measurement beam to contact the measurement surface as an array of focused spots, each soot comprising light derived from the common source, the optical relay comprising at least one lens.

54. The system of claim 53, wherein the interferometer further comprises a beamsplitter, and wherein the lenslet array is positioned to produce an intermediate beam comprising an array of sub-beams, and the beamsplitter is positioned to separate the intermediate beam into the measurement beam and the reference beam, and the measurement beam contacts the measurement surface as the array of focused spots and wherein each of the focused spots corresponds to a different one of the sub-beams.

55. The system of claim 54, wherein the optical relay comprises a telecentric relay configured to image the intermediate beam from the lenslet array to the beamsplitter.

56. The interferometry system of claim 53, wherein the lenslet array comprises a plurality of lenslets and the at least one lens of the relay receives light from all of the lenslets.

57. An interferometric system comprising:
an interferometer configured to receive a light beam from a light source and generate an optical interference pattern; and
a lens system including a numerical aperture converter and at least one focusing element, the lens system configured to transmit the light beam from the light source to the interferometer, the numerical aperture converter of the lens system configured to receive the optical interference pattern and form a virtual image thereof, the at least one focusing element configured to image the virtual image of the optical interference pattern onto a detector, wherein the numerical aperture converter matches an objective numerical aperture of the lens system for illuminating the interferometer to an image numerical aperture of the lens system for imaging the optical interference onto the detector.

58. The interferometric system of claim 57, wherein the system is configured to form a real image of the optical interference pattern prior to forming the virtual image thereof.

59. A method for profiling the surface of an object with an interferometric system, the method comprising:
transmitting a light beam from a light source to an interferometer through a lens system; and
receiving an optical interference pattern produced by the interferometer;

forming a virtual image of the optical interference pattern; and imaging the virtual image of the optical interference pattern onto a detector via the lens system, wherein the lens system includes a numerical aperture converter which matches an objective numerical aperture of the lens system for illuminating the interferometer to an image numerical aperture of the lens system for imaging the optical interference onto the detector.

60. The method of claim 59, comprising, prior to the forming the virtual image of the optical interference pattern, forming a real image of the optical interference pattern.

61. An interferometry method, comprising:

preparing, from a common source beam, a plurality of sub-beams;

relaying, using an optical system comprising at least one focusing element, a first portion of each sub-beam to a respective, different location of a measurement surface and a second portion of each sub-beam to a respective, different location of a reference surface;

combining light reflected from the measurement surface and light reflected from the reference surface; and detecting the combined light.

62. The method of claim 61, wherein relaying comprises collimating the plurality of sub-beams.

63. The method of claim 61, wherein preparing the plurality of sub-beams comprises directing the common source beam to a lenslet array.

64. An interferometric system, comprising:

a detector;

an interferometer, comprising:

a lenslet array configured to prepare a plurality of sub-beams from a common source beam; and a beam splitter configured to prepare, from respective sub-beams, a measurement beam and a reference beam; and at least one focusing element positioned to relay the plurality of sub-beams from the lenslet array to the beam splitter; and wherein the interferometer is configured to direct the respective measurement beams to a measurement surface and the respective reference beams to a reference surface and to combine light reflected from the measurement surface and light reflected from the reference surface on the detector.

65. The interferometric system of claim 64, wherein the interferometer comprises an optical system comprising the at least one focusing element, the optical system configured to collimate the plurality of sub-beams.

66. The interferometry system of claim 64, wherein the at least one focusing element focuses all of the sub-beams.

67. An interferometry method, comprising:

directing a first portion of light to a measurement surface and directing a second portion of light to a reference surface, the first and second portions of light being derived from a common source;

directing light reflected from the measurement surface and light reflected from the reference surface to a lenslet array;

forming a virtual image comprising light reflected from the measurement surface and light reflected from the reference surface, the virtual image being spaced apart from the measurement and reference surfaces; and imaging the virtual image onto a detector.

68. The interferometry method of claim 67, comprising forming the virtual image using the lenslet array.

* * * * *

UNITED STATES PATENT AND TRADEMARK OFFICE
CERTIFICATE OF CORRECTION

PATENT NO. : 6,909,509 B2
DATED : June 21, 2005
INVENTOR(S) : Peter De Groot

It is certified that error appears in the above-identified patent and that said Letters Patent is hereby corrected as shown below:

Column 13,
Line 66, replace "an" with -- a --.

Column 14,
Line 23, after "each" replace "soot" with -- spot --.

Signed and Sealed this

Seventh Day of February, 2006

JON W. DUDAS
*Director of the United States Patent and Trademark Office*